United States Patent
Haskal

[15] 3,705,758
[45] Dec. 12, 1972

[54] APPARATUS FOR CONTROLLING A BEAM OF COHERENT ELECTRO-MAGNETIC WAVES

[72] Inventor: Haim Haskal, Brookline, Mass.

[73] Assignee: Honeywell Inc., Minneapolis, Minn.

[22] Filed: Dec. 30, 1969

[21] Appl. No.: 889,054

[52] U.S. Cl..............350/160 R, 331/94.5, 346/108
[51] Int. Cl. ..........G02f 1/28, H01s 3/00, G01d 9/42
[58] Field of Search.......350/160, 175 GN; 331/94.5; 356/160

[56] References Cited
UNITED STATES PATENTS 3,402,001  9/1968  Fleischer.............................350/162
3,476,463  11/1969  Kreuzer.............................331/94.5

Primary Examiner—Ronald L. Wibert
Assistant Examiner—V. P. McGraw
Attorney—Fred Jacob and Ronald I. Reiling

[57] ABSTRACT

Focusing means in the path of a beam of coherent electro-magnetic waves focus the beam on a focal plane. The beam intensity varies across the diameter. First transparent refractive means in the path of the more intense portion of the beam transmits the waveforms but retards their phase. Second transparent refractive means in the path of the less intense portion of the beam transmits the less intense waveforms but retards their phase an amount different from that of the first refractive means. Interference at the focal plane between the phase changed waveforms alters the original intensity profile of the waveforms. By controlling the relative phase changes the intensity pattern can be altered to be substantially uniform across the beam with only small loss of energy.

12 Claims, 3 Drawing Figures

PATENTED DEC 12 1972

3,705,758

INVENTOR
HAIM HASKAL
BY Leo Stanger
ATTORNEY

APPARATUS FOR CONTROLLING A BEAM OF COHERENT ELECTRO-MAGNETIC WAVES

BACKGROUND OF THE INVENTION

This invention relates to apparatus for controlling variations in intensity within beams of coherent electro-magnetic waves, and particularly to systems that require laser beams having predetermined cross-sectional intensity profiles such as thermo-magnetic recording systems, flying spot scanner systems, and machining systems.

In such systems it is desirable for a laser beam to focus upon a focal plane with a uniformly intense cross-section or with some other predetermined cross-sectional intensity profile. This is necessary because the more intense portions of the beam may be the only ones that can reliably exceed the threshold required for performing the desired function. The less intense portions may produce spurious responses. In thermo-magnetic or flying spot recording systems the absence of such variations improves the resolution and permits a tighter packing density. In machining operations it may be desirable for the intensity to be greatest at the edges of the beam so that the heating is isothermal.

For these purposes a laser beam creates problems because it exhibits a Gaussian profile at the lowest order mode. This requires re-shaping. Such re-shaping has been accomplished by utilizing only the most intense portion of the beam and absorbing the remainder. Such absorption is wasteful of the energy in the beam. In many cases, 90 percent of the laser power transmitted by the system is lost. Losses of only 60 percent have been reported for some of the improved systems.

SUMMARY OF THE INVENTION

The invention eliminates these deficiencies and reduces the losses. According to the feature of the invention the more intense portions of the beam and less intense portions of the beam are each phase retarded at different rates so that when they are focused upon the focal plane the resulting interference forms a modified intensity pattern.

According to another feature of the invention respective refractive means in the path of the more intense portion and the less intense portion of the beam perform the retardation so as to change the phases. Preferably, the refractive means transmit substantially all the energy in the waveforms passing through them and any energy absorbed by the refractive means is absorbed in virtually the same proportion in both of the refractive means.

According to another feature of the invention the beam of coherent electro-magnetic waves is a laser beam and the refractive means include respective homogeneous materials having different refractive indices with respect to the laser beam.

According to still another feature of the invention at least one of the materials comprises an electro-optic material whose refractive index varies according to an electric field across it. Further, electrode means form an electric field in the electro-optic material so as to change the refractive index and control the phase change on the basis of the electric field and thereby achieve a given intensity pattern.

According to still another feature of the invention the materials surround each other and the electrode means include electrodes at the interface between the materials.

According to still another feature of the invention the sensor means sense the relative intensities of the beam at different points of the beam and correct or control the voltage of the electrodes on the basis of the measured intensities.

According to still another feature of the invention compensating means have a refractive portion so that in the unenergized condition of the electrodes the refractive means together with the compensating means impart no net phase change to the waveforms. Under these circumstances the beam is substantially unchanged when no voltage is applied to the electrodes.

By virtue of the invention electromagnetic wave beams may have their cross-sectional intensity profiles changed with minimum energy loss. The invention permits effective utilization of approximately 80 percent of the original energy.

These and other features of the invention are pointed out in the claims. Other objects and advantages of the invention will become obvious from the following detailed description when read in light of the accompanying drawing.

DESCRIPTION OF THE PREFERRED EMBODIMENT

Figure 1:
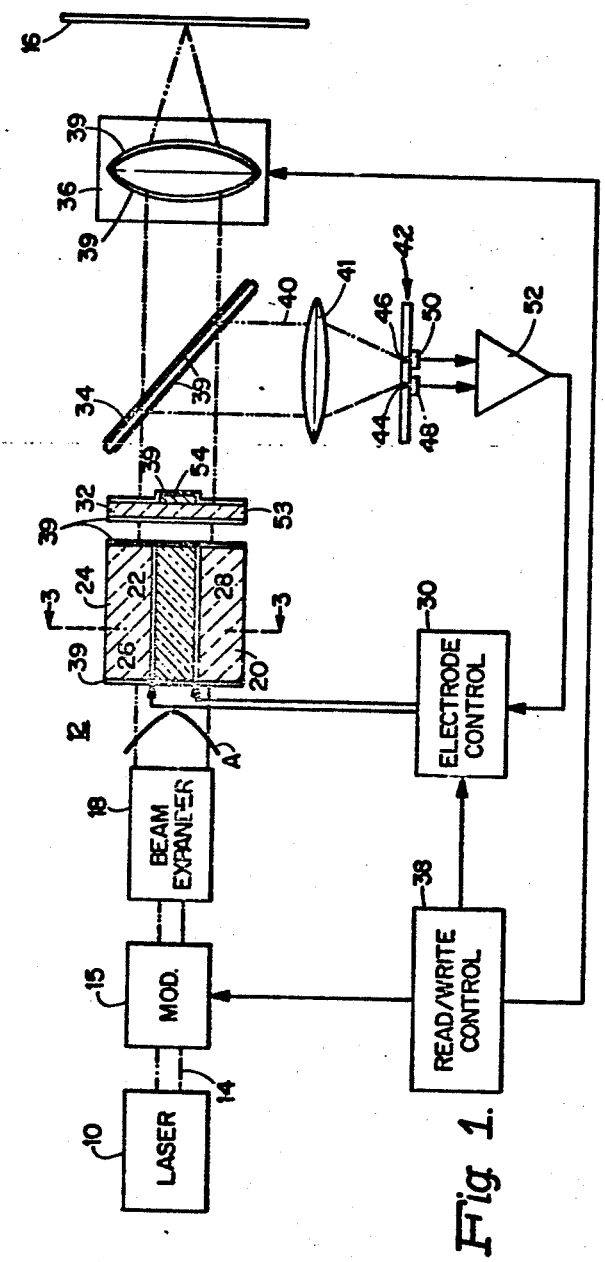
FIG. 1 is a schematic block diagram illustrating a recording system embodying features of the invention.

In FIG. 1 a laser 10 of an optical memory system 12 forms a beam 14. The latter is modulated by a modulator 15 and ultimately focused upon a recording medium 16. The recording medium may for example be a photographic film. It may also constitute a planar plate of Manganese Bismuth (MnBi) which is magnetized across its thickness in one direction. The beam is normally used to record information on the recording medium 16, when it is composed of Manganese Bismuth, by beam heating it with the laser beam until it reaches the Curie point temperature. At this time, the heated spot loses its magnetization. While the area is cooling again the fringe magnetization of the surrounding areas re-magnetizes it in the other direction. Such re-magnetization may be sensed optically to retrieve information thus recorded, in a binary manner at a number of locations on the recording medium. To erase the information the spot is again heated to the Curie point and allowed to cool in the presence of an external magnetic field.

Figure 2:
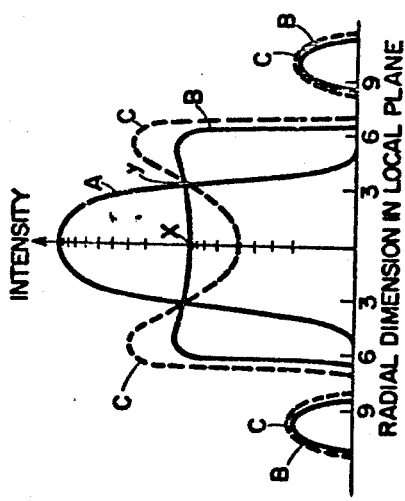
FIG. 2 is a graph illustrating various cross-sectional intensities of the beam at the focal plane in FIG. 1.

The beam 14 emerging from the laser 10 and the modulator 15 has the Gaussian cross-sectional intensity illustrated by the curve A in FIG. 2. Under these circumstances the intensity is greatest at the center and falls off gradually to the edges of the beam. If such a source were used for thermomagnetic writing, slight changes in the threshold level or power level might produce large changes in spot size. It might also cause local damage to the recording medium 16.

According to the invention a beam expander 18 enlarges the beam while maintaining its relative intensity profile. The beam then enters an electro-optic phase filter 20 also shown in FIG. 3. The filter is composed of a central cylindrical, transparent, electro-optic crystal 22 and a surrounding transparent medium 24. The crystal 22 is arranged to be coaxial with the beam 14 and to lie in the path of the beam's more intense central portion. The less intense beam portion passes through surrounding medium 24. The medium 24 is composed of a transparent material such as glass, or liquid held in a transparent container. It may also constitute a crystal, or simply the air surrounding the crystal 22. The crystal 22 and the medium 24 exhibit respective indices of refraction that exert respective phase retardation to the coherent waves. Examples of a suitable electro-optic crystal 22 is potassium dihydrogen phosphate (KDP). Lithium niobate ($LiNbO_3$) is another example.

Figure 3:
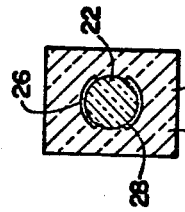
FIG. 3 is a section 3—3 of the filter in FIG. 1.

At the interface between the crystal 22 and medium 24 a pair of electrodes 26 and 28 control the refractive index of the crystal 22. The electrodes 26 and 28 may be thin films mounted on the surface of crystal 22. In FIGS. 1 and 3 the thicknesses of the electrodes are exaggerated for clarity. When an electrode control 30 changes the voltage across the electrodes 26 and 28 the electrostatic field across the electro-optic crystal changes. This changes the index of refraction of the crystal 22 and hence changes the phase retardation of the coherent magnetic waves within the more intense portion of the laser beam. The crystal 22 is about 6 inches long to permit the voltages across the electrodes to control the refractive index over a wide range.

The medium 24 retards the phase of the less intense outside portion of the beam at a different rate than the crystal 22. The expanded and phase filtered beam passes through a compensating plate 32 and a beam splitting mirror 34 that deflects 1 percent and passes 99 percent of the energy in the beam. It then passes through a focusing system 36 that focuses the beam on the medium 16 as required by the read/write control 38 of the writing system according to the invention. Deflection means not shown deflect the beam to the desired location. The read/write control 38 also regulates the output of the laser 10 by means of the modulator 15.

At the focal plane in the recording medium 16 the interference between the electro-magnetic waves phase retarded by the crystal 22 and those phase retarded by the medium 24 interfere with each other to alter the intensity profile of the beam. This interference in the wave creates energy cancellation in some circular bands and energy reinforcement in others. As a result, the intensity pattern of the beam is altered. Anti-reflection coatings 39 cover each face encountered by the beam. Thickness of the coatings are exaggerated for clarity. These coatings keep the total overall reflective energy loss down to about 2 percent.

According to one embodiment of the invention the electrode control 30 sets the index of refraction of the crystal 22 relative to the medium so as to produce an intensity pattern corresponding to the curve B in FIG. 2. Because of the interference at the focal plane, the curve B forms a central portion wider than the beam 14. It includes two side lobes whose energy level is approximately 15 db down from the maximum energy level of the central portion. The lobes are thus substantially ineffective to produce Curie point writing upon the medium 16. These side lobes contain approximately 15 percent of the total energy and thereby leave substantially the remaining energy within the central portion of the focused beam. Because the refractive crystal 22 and medium 24 and the compensating device 32 as well as the focusing and beam spreading focusing device 36 and beam splitting mirror 34 absorb only approximately 2 percent of the total energy in the beam, approximately 80 percent of the energy may be expected to remain within the central portion of the beam at the focal plane. Non-crystalline electro-optic materials which change the phase of light waves passing through them in dependence upon an electric field applied them may be substituted for the electro-optic crystal 22. The medium 24 and crystal 22 need not be coextensive in length.

The beam splitting mirror 34 reflects approximately 1% of the energy or power in the beam emerging from the filter 20 to form a test ray 40. A lens 41 focuses the latter onto an opaque mask 42 having a pair of pinholes 44 and 46 located at two points in the ray. The location corresponds to two points in the beam and to the points marked X and Y in the curve B of FIG. 2. Light emerging through these pinholes passes to a pair of photodetectors 48 and 50. A differential amplifier 52 compares the relative output of the photodetectors.

By sensing the light intensity at the points X and Y with the pinholes 44 and 46 it is possible to determine the general characteristic of the curve B. The electrode control 30 detects the differential output and varies the control voltage across the electrodes 26 and 28. This changes the refractive index of the crystal 22 and its phase retardation relative to the medium 24. This then varies the cross-sectional intensity profile of the beam emerging from the filter 20 so that the intensity measured by the photodetectors 48 and 50 varies. The process continues until the electrode control 30 establishes that the output of the amplifier 52 indicates a predetermined proportion of light intensities at the photodetectors 48 and 50. This proportion is preset into the control 30.

The compensating device 32 is composed of a transparent plate 53 and a transparent thin film coating 54 coaxial with the beam. Its effect is to vary the differences in phase retardation between the more intense center of the beam and the outside of the beam so that when no voltage exists across the electrodes 26 and 28 the beam intensity profile corresponds to the emerging from the laser 10.

The electrode control 30 may be composed of a d.c. voltage source whose output varies in dependence upon the differential input, and upon a preset input-to-output voltage ratio control setting. Various configurations of the electrodes may be used to obtain particular intensity profiles.

The invention furnishes an improved system that controls the cross-sectional intensity profile of a laser beam with minimum energy loss. By proper variation of the relative refractive indices, that is by varying the index of crystal 22 with the voltage from electrode control 30, other cross-sectional profiles may be achieved. For example, a curve such as C may be obtained. Such an intensity profile is useful in machining to inhibit the effect of heat loss at the edge of the cut and thereby derive an isothermal circular heat profile.

By obtaining the intensity profile of curve B in the system of FIG. 1, the invention furnishes a recording system that records spot sizes of substantially constant size without danger of overexposing the center.

By making the inherent refractive indices of the materials in crystal 22 and medium 24 sufficiently different without application of voltages to the electrodes the phase filter 20 may operate as a passive device. Such a passive device may be very short because long length of the crystal 22 is not necessary for obtaining the wide refractive index changes necessary in the active filter. In fact the passive filter may be constructed like the compensator 32.

The change in the width of the beam between that of curve A to that of curve B has the advantage of offering improved reading capability with the beam. In recording systems like thermomagnetic or flying spot recording it is possible to read optically with the beam. However, it is then desirable to read with a beam whose width is somewhat smaller than the spot which has been recorded. By attenuating the overall intensity of the original beam with the modulator or a partly transparent plate and adjusting the electrode control to produce an output corresponding to the curve A, the beam 14 can be used to read as well as write. An optical analyzer in the focusing system can be used to analyze the writing.

While embodiments of the invention have been described in detail it will be obvious to those skilled in the art that the invention may be embodied otherwise without departing from its spirit scope.

What is claimed is:

1. Apparatus for controlling a beam of coherent electromagnetic waves whose intensity varies across the beam comprising,
   first transparent refractive means in the path of the more intense portion of the beam for transmitting the waveforms in the more intense portion but changing their phase,
   second transparent refractive means in the path of the less intense portion of the beam for transmitting the waves in the less intense portion of the beam and changing their phase an amount different from that of said first refractive means, and
   focusing means other than said first or second refractive means located in the path of both the more intense and less intense portion of the beam for focusing the beam on a focal plane,
   whereby interference at the focal plane between the phase-changed waveforms alters the intensity pattern of the waveforms.

2. Apparatus as in claim 1 wherein each of said refractive means transmit substantially all the energy in the waveforms passing through the respective refractive means and any energy absorbed by said refractive means is absorbed in virtually the same proportion in both of said refractive means.

3. Apparatus as in claim 1 wherein the beam of coherent electromagnetic waves is a laser beam and wherein said refractive means each includes a transparent material, said materials having different refractive indices with respect to the laser beam.

4. An apparatus as in claim 3 wherein one of said materials comprises an electro-optic material whose refractive index varies according to an electric field, and further comprising electrode means for forming an electric field in said electro-optic material, whereby the refractive index and hence the phase change of said material can be controlled on the basis of the electric field and whereby the cross-sectional intensity pattern of the waveform at the focal plane can be varied to achieve a given intensity pattern.

5. Apparatus as in claim 4 wherein the more intense portion of the beam is in the center and one of said materials is aligned with the center of the beam and the other of said materials surrounds the first of said materials, the first of said materials being electro-optic, said electrode means including an electrode at the interface between said materials, and control means for controlling the voltage of said electrode.

6. Apparatus as in claim 5 further comprising compensating means in the path of said beam, said compensating means having a center refractive portion and a surrounding refractive portion, said refractive portions having respective indices of refraction to reverse the phase changes imparted by said first refractive means and said second refractive means so that in the unenergized condition of the electrodes said refractive means and said compensating means impart no net phase change to said waveforms.

7. Apparatus as in claim 5 wherein said control means include sensing means extending in the path of the beam for sensing the relative intensities of two points in the beam, and means connected to said sensing and said electrode means for adjusting the voltage of said electrode means in response to the relative intensities sensed by said sensing means.

8. The method of controlling a beam of coherent electromagnetic waves whose intensity varies across the beam, which comprises changing the phase of waveforms in the more intense portion of the beam with first refractive means, changing the phase of the waveforms in another portion of the beam an amount different from that of the first refractive means with second refractive means, and then focusing the so changed beam onto a focal plane by means other than said refractive means so that interference at the focal plane between the phase changed waveforms alters the intensity pattern of the waveforms.

9. The method as in claim 8 further comprising the step of varying the refractive index of one of the refractive means so as to change the interference pattern at the focal plane and produce a predetermined intensity pattern.

10. The method as in claim 8 further comprising the step of sensing the relative intensities of two points in the beam and on the basis of the relative intensities controlling the refractive index of one of said refractive means so as to change the phase of the beams of the waveforms passing therethrough to produce a predetermined intensity pattern.

11. Apparatus for controlling a beam of coherent electromagnetic waves whose intensity varies across the beam comprising:
   first transparent refractive means in the path of the more intense portion of the beam for transmitting the waveforms in the more intense portion but changing their phase, second transparent refractive means in the path of the less intense portion of the beam for transmitting the waves in the less intense portion of the beam and changing their phase an amount different from that of said first refractive means,
at least one of said refractive means comprising an electro-optic material whose refractive index varies according to an electric field,
electrode means for forming an electric field in said electro-optical material, whereby the refractive index and hence the phase change of said material can be controlled on the basis of the electric field,
compensating means in the path of said beam, said compensating means having a center refractive portion and a surrounding refractive portion, said refractive portions having respective indices of refraction to reverse the phase changes imparted by said first refractive means and said second refractive means so that in the unenergized condition of the electrode means said first and second refractive means and said compensating means impart no net phase change to said waveforms, and
focusing means in the path of both the more intense and less intense portion of the beam for focusing the beam on a focal plane.

12. Apparatus as in claim 11 further including control means having sensing means extending in the path of the beam for sensing the relative intensities of two points in the beam, and means connected to said sensing and said electrode means for adjusting the voltage of said electrode means in response to the relative intensities sensed by said sensing means.

* * * * *